US012179273B2

(12) United States Patent
Hollfelder

(10) Patent No.: US 12,179,273 B2
(45) Date of Patent: Dec. 31, 2024

(54) MACHINE TOOL

(71) Applicant: Guehring KG, Albstadt (DE)

(72) Inventor: Hans-Peter Hollfelder, Fuerth (DE)

(73) Assignee: Guehring KG, Albstadt (DE)

( * ) Notice: Subject to any disclaimer, the term of this patent is extended or adjusted under 35 U.S.C. 154(b) by 662 days.

(21) Appl. No.: 17/380,301

(22) Filed: Jul. 20, 2021

(65) Prior Publication Data

US 2022/0009004 A1 Jan. 13, 2022

Related U.S. Application Data

(63) Continuation of application No. PCT/EP2020/051098, filed on Jan. 17, 2020.

(30) Foreign Application Priority Data

Jan. 21, 2019 (DE) ..................... 10 2019 200 692.2

(51) Int. Cl.
*B23B 29/04* (2006.01)
*B22F 10/20* (2021.01)
(Continued)

(52) U.S. Cl.
CPC .............. *B23B 29/02* (2013.01); *B22F 10/20* (2021.01); *B23B 27/04* (2013.01); *B23B 29/043* (2013.01); *B23B 29/12* (2013.01); *B23B 2205/02* (2013.01); *B23B 2205/04* (2013.01); *B23B 2231/24* (2013.01)

(58) Field of Classification Search
CPC ....... B23B 27/04; B23B 29/043; B23B 29/12; B23B 2205/04; B23B 29/08; B23B 2231/46; B23B 29/02; B23B 2205/02; B23B 2231/0244; B23B 2231/24; B22F 10/20; B22F 2005/001; B33Y 80/00
See application file for complete search history.

(56) References Cited

U.S. PATENT DOCUMENTS

| | | | |
|---|---|---|---|
| 3,187,408 | A | 6/1965 | Titterud |
| 3,191,261 | A | 6/1965 | Yore |

(Continued)

FOREIGN PATENT DOCUMENTS

| | | | |
|---|---|---|---|
| DE | 40 24 096 | A1 | 2/1992 |
| DE | 42 12 709 | A1 | 10/1993 |

(Continued)

OTHER PUBLICATIONS

International Search Report and Written Opinion (Application No. PCT/EP2020/051098) dated Apr. 15, 2020 (with English translation).

(Continued)

*Primary Examiner* — Sara Addisu
(74) *Attorney, Agent, or Firm* — Brown & Brown IP Law PLLC

(57) ABSTRACT

The invention relates to a machine tool (1) comprising a clamping holder (10) which extends along a longitudinal axis (3) and a cutting element (20) that can be inserted into an open tool-side recess (40), which passes through the clamping holder (10), transversely to the longitudinal axis (3). The machine tool (1) has a stop (30) which is secured in the recess (40) and against which the cutting element (20) rests in the direction transverse to the longitudinal axis (3).

17 Claims, 5 Drawing Sheets

(51) Int. Cl.

| | |
|---|---|
| ***B23B 27/04*** | (2006.01) |
| ***B23B 29/02*** | (2006.01) |
| ***B23B 29/12*** | (2006.01) |

(56) References Cited

U.S. PATENT DOCUMENTS

| | | | | |
|---|---|---|---|---|
| 3,274,862 | A | 9/1966 | Babich et al. | |
| 3,534,457 | A * | 10/1970 | Mueller | B23B 27/04 407/112 |
| 3,882,582 | A * | 5/1975 | Williams | B23D 35/002 407/41 |
| 3,939,539 | A | 2/1976 | Novak | |
| 4,357,123 | A * | 11/1982 | Zweekly | B23B 27/045 407/117 |
| 5,370,023 | A | 12/1994 | Morgan et al. | |
| 6,558,087 | B1 * | 5/2003 | Hollfelder | B23C 5/2479 407/107 |
| 7,445,410 | B2 * | 11/2008 | Abramson | B23B 51/101 408/93 |
| 8,622,662 | B2 * | 1/2014 | Heckel | B23C 5/2243 407/50 |
| 8,647,029 | B2 * | 2/2014 | Hecht | B23B 27/045 407/107 |
| 2008/0247832 | A1 | 10/2008 | Maier et al. | |
| 2012/0070241 | A1 * | 3/2012 | Heckel | B23C 5/24 407/44 |
| 2013/0142582 | A1 | 6/2013 | Lee | |
| 2014/0133924 | A1 | 5/2014 | Oren et al. | |
| 2015/0165527 | A1 | 6/2015 | Roman | |

FOREIGN PATENT DOCUMENTS

| | | | |
|---|---|---|---|
| JP | 2010-179380 | A1 | 8/2010 |
| KR | 10 2011 0108230 | A | 10/2011 |

OTHER PUBLICATIONS

DPMARegister Print out dated Jul. 22, 2021.

* cited by examiner 3
13
20
15

MACHINE TOOL

The invention relates to a machine tool comprising a clamping holder, which extends along a longitudinal axis, and a cutting body that can be inserted into a recess, which passes through the clamping holder in a direction transversely to the longitudinal axis and which is open on the front side of the tool.

A generic machine tool is known, for example, from the publication U.S. Pat. No. 3,187,408 A. The machine tool shown in the publication has a base body or clamping holder, respectively, which extends along a longitudinal axis, has a round cross section, and in one embodiment is clamped on its shaft-side end into a tool spindle of a turning tool. The end of the base body on the front side of the tool located opposite the shaft-side end has a recess, which extends transversely to the longitudinal axis and which passes through the base body, has essentially a round cross section, and is open on the front side of the tool. The base body furthermore has a slot, which extends from the base of the recess along the longitudinal axis and which divides the end of the base body on the front side of the tool into two elastically deformable tensioning portions. A tensioning screw arranged transversely to the longitudinal axis or direction of extension, respectively, of the slot in the base body can brace the two tensioning portions to one another in such a way that a cutting insert, which is inserted into the recess, is secured or clamped, respectively, in a non-positive manner in an operating position, and can perform a workpiece processing in a cutting manner on the circumferential side of the tool. The continuous recess, which is open on the front side of the tool, can receive different types of cutting inserts, which can be formed so as to cut both circumferentially and on the front side.

Further machine tools, which are similar to the machine tool of U.S. Pat. No. 3,187,408 A, are shown in the publication U.S. Pat. No. 3,274,862 A. In contrast to the machine tool of U.S. Pat. No. 3,187,408 A, a continuous recess, which, in a tool embodiment of U.S. Pat. No. 3,274,862 A, is formed on an end on the front side of the tool of a base body or clamping holder, respectively, and which has a round cross section, is essentially rectangular and has a base surface arranged transversely to the longitudinal axis and two flank surfaces arranged transversely to the base surface, wherein one of the flank surfaces has a protrusion, which protrudes into the recess. An essentially rectangular cutting body holder, which holds a cutting body on its front side, can be inserted into the recess, wherein, on a side surface of the cutting body holder, a groove is formed, which engages with the protrusion of the recess, as a result of which the cutting body holder is secured in the direction of the longitudinal axis of the base body, i.e. axially. Three tensioning screws screwed in the base body push laterally against a side surface of the cutting body holder, which can be displaced transversely to the longitudinal axis of the base body in the recess. The cutting body holder is thus also secured in the direction of extension of the recess or in a direction transversely to the longitudinal axis of the base body, respectively, i.e. radially. The cutting body held in the cutting body holder can be formed so as to cut both circumferentially and on the front side. In a different tool embodiment of U.S. Pat. No. 3,274,862 A, a cutting plate is inserted directly in a radially continuous recess and is secured by means of clamping.

A machine tool in the form of a boring bar, which has a round cross section, is proposed in DE 40 24 096 C2. On its front end, the boring bar has a slot, which extends along the longitudinal axis of the boring bar and which divides the boring bar into a clamping leg and a holding shaft. The clamping leg pushes against a side surface of a cutting body, which sits in a recess of the holding shaft. In contrast to the above-described recesses, the recess of the holding shaft of the boring bar of DE 40 24 096 C2, however, is not continuous, but is formed in a pocket-like manner in such a way that the cutting body abuts against three bearing surfaces, which are formed at an acute angle to one another, in the recess. The cutting body is therefore secured in a non-positive manner in a direction transversely to the longitudinal axis of the boring bar. A threaded hole, which serves to receive a spreading mandrel, passes through the clamping leg. When the spreading mandrel is screwed into the threaded hole in the clamping leg, the protruding end of the spreading mandrel is supported on the holding shaft, so that the clamping leg and the holding shaft are elastically pushed apart, and a cutting body can be inserted into the pocket-like recess. The cutting body, which sits in the recess, can be formed so as to cut both circumferentially and on the front side.

As described above, the machine tools of U.S. Pat. No. 3,187,408 A and of U.S. Pat. No. 3,274,862 A in each case have a recess, which passes through the base body or clamping holder, respectively. A positionally accurate positioning of the cutting body received in the recess in the direction of extension of the recess or in a direction transversely to the tool longitudinal axis, respectively, is thus only possible in a relatively inaccurate manner. In the case of the boring bar of DE 40 24 096 C2, the cutting body abuts on a bearing surface in the pocket-like recess and is thus secured in a positive manner in a direction transversely to the longitudinal axis. The formation of the bearing surfaces of the recess pocket at an acute angle to one another, however, is relatively complex and time-intensive.

Based on the machine tool of U.S. Pat. No. 3,187,408 A, the invention is thus based on the object of providing a machine tool comprising a clamping holder, which extends along a longitudinal axis, and a cutting body that can be inserted into a recess, which passes through the clamping holder in a direction transversely to the longitudinal axis, is open on the front side of the tool, and in the case of which the cutting body can be easily positioned in a positionally accurate manner.

The object is solved by means of a machine tool comprising the features of independent claim 1. Advantageous or preferred designs are in each case subject matter of dependent claims.

A machine tool according to the invention has a clamping holder, which extends along a longitudinal axis, preferably longitudinal central axis, and a cutting body that can be inserted into a recess, which passes through the clamping holder in a direction transversely to the longitudinal axis and which is open on the front side of the tool. The machine tool is characterized by a stop, which is secured in the recess and against which the cutting body abuts in the direction transversely to the longitudinal axis.

The machine tool can be a non-rotating, stationary tool, which is used, for example, as turning tool, or a non-rotating, but movable tool, e.g. a tool for cutting off, external grooving, internal grooving, axial grooving, profile turning, and the like. The machine tool, however, can also be rotationally drivable or rotary, respectively, wherein the longitudinal axis corresponds to an axis of rotation of the tool in this case. However, the machine tool is preferably a non-rotating tool for a grooving.

The clamping holder, which is of elongate design, can be functionally divided into a shaft part (axially in the rear with respect to the machine tool), a clamping part (axially in the front with respect to the machine tool), and optionally a connecting portion, which connects the clamping part in the longitudinal direction. The clamping part, however, can also connect directly to the shaft part. The shaft part serves to connect the machine tool to a turning machine or a tool machine spindle in the usual way. The clamping part has the recess, in which the cutting body sits, which is preferably made of hard metal. The recess, which is open on the front side of the tool, passes through the clamping part of the clamping holder in a direction transversely to the longitudinal axis. The recess can therefore be made easily, e.g. by means of a straight grinding or milling of the clamping part of the clamping holder in a direction transversely to the longitudinal axis. However, the recess is preferably formed by means of wire eroding.

Both the materials and the cross sections of the shaft part, of the clamping part, and optionally of the connecting portion, can be identical or are different from one another.

The clamping part can have a round or non-round, preferably elliptical or symmetrically oval, cross section. In the case of a round cross section, the recess passes radially through the clamping part, preferably radially. In the case of a non-round, e.g. elliptical or symmetrically oval cross section, the recess passes through the clamping part, preferably centrally, i.e. over the longitudinal central axis. Aside from tensioning or clamping surfaces, the shaft part as well as the connecting portion can be embodied cylindrically, for example.

At least the clamping part, which, due to the recess, which receives the cutting body, can be constructed in a rather more complex manner than the connecting portion or the shaft part, can be produced by means of an additive or generative manufacturing process, e.g. by means of 3D printing, and can be connected, for example in a positive manner, in a non-positive manner, and/or by means of a substance-to-substance bond, e.g. by means of screwing, soldering, or the like, to the shaft part or optionally to the connecting portion of the clamping holder in an axially and rotationally fixed manner.

In the alternative, however, the clamping part, the shaft part, and optionally the connecting portion can also be formed integrally, i.e. in one piece.

According to the invention, the machine tool has a stop, which is secured in the recess and against which the cutting body abuts in the direction transversely to the longitudinal axis. The stop, which is manufactured separately from the clamping part or clamping holder, respectively, thus provides for a securing of the cutting body in the insertion direction of the cutting body or in the direction transversely to the longitudinal axis, respectively. A positionally accurate positioning of the cutting body with respect to the clamping holder can thus be realized in a simple manner. In the direction transversely to the longitudinal axis, the cutting body preferably abuts against the stop in such a way that it projects out of the clamping holder on the circumference of the tool.

The stop is preferably formed by means of a stop bolt or stop pin, e.g. cylinder pin, which is fastened to the clamping part of the clamping holder and which protrudes into the recess. The stop bolt can be produced very easily and can be fastened, for example, in a hole, which extends in the longitudinal direction of the clamping part of the clamping holder, in the base of the recess, e.g. by means of a tight fit. It is also possible that the stop is formed by means of a standard part, e.g. a screw, which is screwed to the clamping part of the clamping holder, a screw bolt, which is screwed to the clamping part of the clamping holder, or the like.

A bearing surface on the cutting body abutting against the stop can be formed in a recess of the cutting body overlapping the stop. In spite of the stop in the recess, the recess can be used over its entire length in its direction of extension or transversely to the longitudinal axis of the clamping part of the clamping holder, respectively, to clamp the cutting body. In other words, a contact length of the cutting body in the recess is not shortened by means of the recess overlapping the stop, or a contact surface of the cutting body with the clamping part of the clamping holder is only reduced slightly, respectively, so that the cutting body can be fastened in the recess in a stable and secure manner.

The recess can be formed in such a way that it receives the cutting body in a positive manner in a direction transversely to its direction of extension. The recess can in particular be formed in such a way that it has a cross section, which tapers in the direction of a front side of the tool. In other words, the cutting body can sit in the recess in such a way that it is secured in a positive manner in the direction of the longitudinal axis of the clamping part of the clamping holder. When the recess has a cross section, which tapers in the direction of a front side of the tool, the cutting body can only be inserted laterally into the recess, whereby it cannot be unintentionally rotated around its insertion direction. A simple positioning of the cutting body in the recess is thus ensured.

The recess is preferably defined by a flat base surface and two flat flank surfaces. The recess can in particular be formed from a base surface, which is arranged transversely, in particular perpendicularly to the longitudinal axis of the clamping part of the clamping holder, a first flank surface, which is arranged parallel to the longitudinal axis and vertically on the base surface, and a second flank surface, which is arranged at an acute angle to the base surface and obliquely to the first flank surface. The flat surfaces can be made very easily by means of a grinding or milling or a wire erosion. Due to the second flank surface, which is arranged at an acute angle to the base surface and obliquely to the first flank surface, the recess has a cross section, which tapers in the direction of the front side of the tool, as a result of which a rotationally secure insertion of the cutting body into the recess is ensured, as described above. Due to the wedge effect of the second flank surface, which is arranged at an acute angle to the base surface, a cutting body inserted into the recess is furthermore also pushed against the base surface during the clamping and can thus be positioned in a stable and firm manner.

The machine tool can have a clamping or tensioning claw, which clamps the cutting body to the clamping holder. The use of a clamping claw is a common and proven measure for a releasable fastening of a cutting body to a clamping holder.

The clamping claw is preferably formed from a first flank, which laterally limits the recess and has the first flank surface. In other words, the clamping claw can be formed integrally with the clamping part of the clamping holder and can be connected via an elastically deformable material joint to the clamping part of the clamping holder. The power transmission to the cutting body sitting in the recess can therefore take place via the first flank surface of the recess, which is formed by the clamping claw. Due to the tight connection of the clamping claw to the clamping part of the clamping holder, an unwanted relative movement between the clamping claw and the cutting body, which is clamped by the clamping claw, is ruled out from the start. The integral setup with respect to assembly and tool setup is furthermore advantageous, because no screw connection or the like is necessary, and the clamping claw is captively and permanently connected to the clamping part of the clamping holder.

In the alternative, however, the clamping claw can also be formed separately from the clamping part of the clamping holder and can be secured to the clamping holder in a suitable manner, e.g. by means of a screw connection.

The clamping part of the clamping holder preferably has a slot, which separates the clamping claw from the base of the recess. The slot can be continuous in a direction transversely to the longitudinal axis of the clamping part of the clamping holder and can extend in an axially parallel manner from the base of the recess in the direction of the shaft part. The slot is preferably arranged laterally of the base of the recess, i.e. eccentrically, based on the tool longitudinal axis. In other words, the slot does not lead into the base surface of the recess, but represents an “extension” of the first flank surface in the direction of the shaft part. The slot thus does not split the base of the recess into two parts, as a result of which the cutting body can abut over the entire surface against the base surface and the above-described second flank surface. The base surface and the second flank surface, which is arranged at an acute angle to the base surface, can form a seat, which securely positions the cutting body.

The clamping claw can preferably be tightened against a second flank by means of a clamping screw. The second flank forms the part of the clamping part located opposite the first flank, which forms the clamping claw. A clamping of the cutting body in the recess by means of the clamping claw can generally be attained with or without a clamping screw. The use of a clamping screw, however, facilitates the assembly of the cutting body in the recess in the case of a correspondingly dimensioned clamping claw and slot. The clamping force, with which the clamping claw clamps the cutting body in the recess, can furthermore be adapted by means of the tightening torque of the clamping screw.

The machine tool can furthermore be formed in such a way that a front side of the first flank forming the clamping claw lies axially behind a front side of the second flank. In other words, the cutting body, which is inserted into the recess, can protrude beyond the front side of the clamping claw in the direction of the longitudinal axis. In particular in the case of cutting bodies, which cut circumferentially and on the front side, a large chip surface for the chips resulting during the workpiece machining can thus be kept free. An obstruction of the chip flow by means of the clamping claw can thus be prevented for the most part.

As described above, the cutting body projects from the clamping part of the clamping holder or from the recess, respectively, preferably on the circumferential side of the tool. It is also possible, however, that the cutting body protrudes beyond the clamping part of the clamping holder additionally or only on the front side of the tool. The cutting body inserted into the recess can be formed so as to cut both circumferentially and on the front side.

The clamping part can have an elliptical or symmetrically oval, non-round cross section, which is defined by a longer major axis and a shorter minor axis, at least for a length portion, which lies axially behind the recess. The cutting body can lie parallel or obliquely to the minor axis in this case. Compared to a clamping part with a round cross section, the diameter of which corresponds to the minor axis of a clamping holder, which has an elliptical or symmetrically oval cross section, a clamping part with elliptical or symmetrically oval cross section has more material for supporting the cutting body in the region of the clamping part, which supports the cutting body, due to the geometric shape. The stability of the clamping part and thus of the clamping holder as a whole is thus increased. When the cutting body lies obliquely, i.e. rotated, to the minor axis, the bearing surface of the cutting body at the clamping part can be increased additionally, which leads to a further increase of the stability. Compared to the minor axis, the cutting body preferably lies so as to be rotated opposite to the cutting force direction, for example by 10°. The torque acting on the cutting body and thus the stressing thereof can therefore be reduced.

The machine tool can have a coolant/lubricant supply channel, which is guided through the clamping holder to the cutting body, comprising a mouth opening, which is aligned towards the cutting edge or the cutting edges on the cutting body.

The coolant/lubricant supply channel can in particular run inside the clamping claw in the clamping part. When at least the clamping part of the clamping holder is a part, which is produced by means of an additive or generative manufacturing process, e.g. 3D printing, any courses of the coolant/lubricant supply channel are possible in the clamping claw, so that the mouth opening of the channel can be guided systematically to the cutting edge of the cutting body.

A preferred embodiment of a machine tool according to the invention will be described below with the help of the enclosed drawings, in which.

Figures 1, 2, 3:
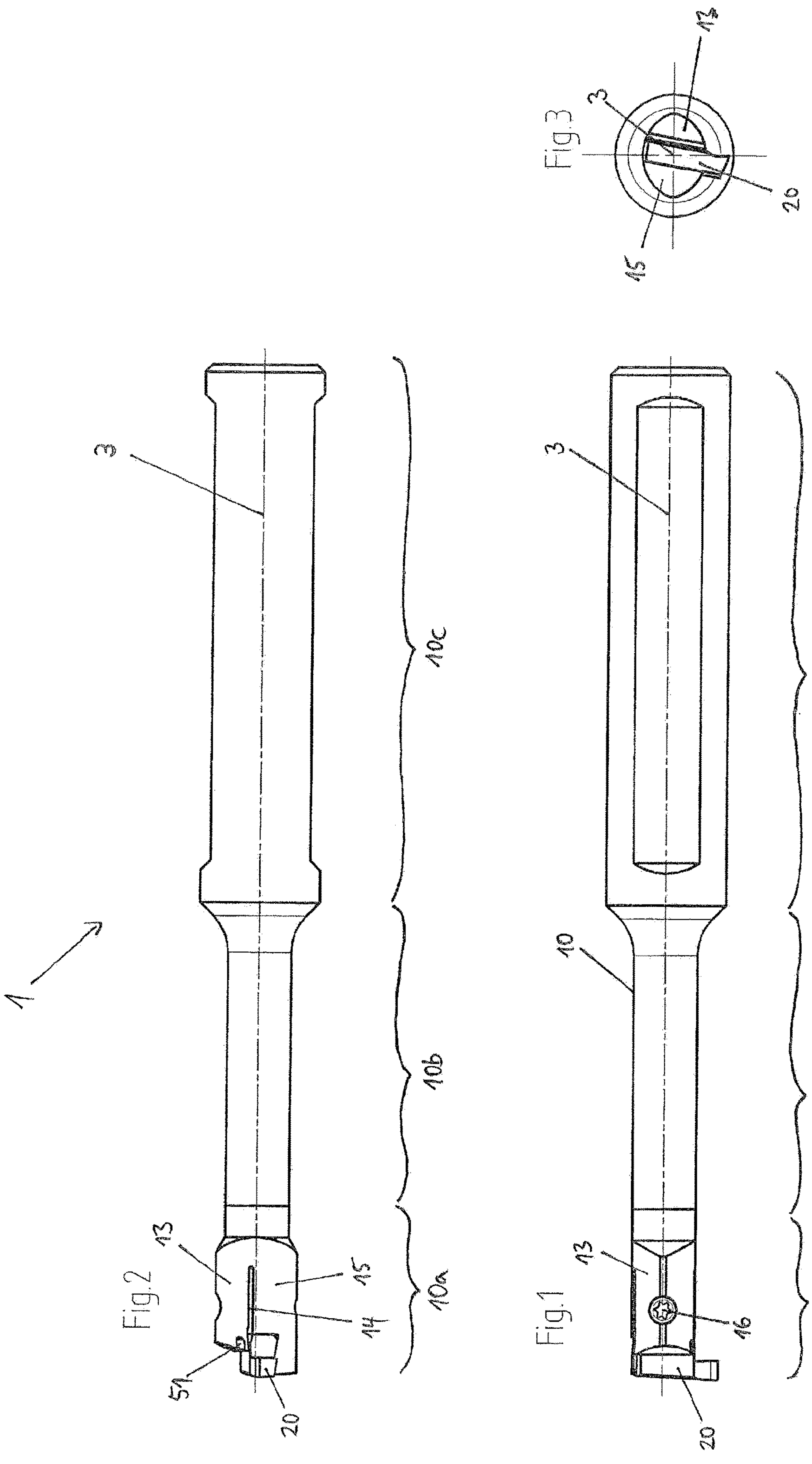
FIG. 1 shows a top view of a machine tool according to the invention.
FIG. 2 shows a side view of the machine tool from FIG. 1.
FIG. 3 shows a front view of the machine tool from FIG. 1.
Figure 4A:
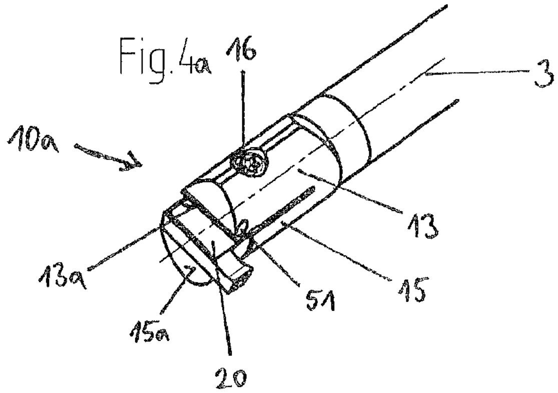
Figure 4B:
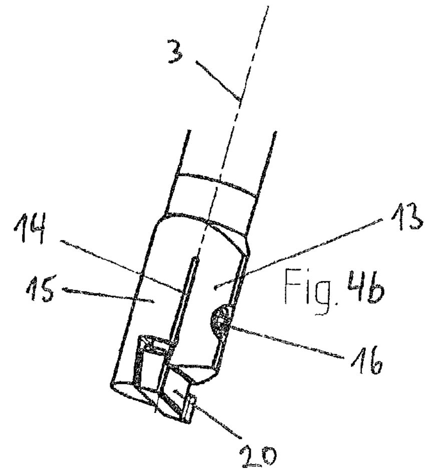
Figure 5:
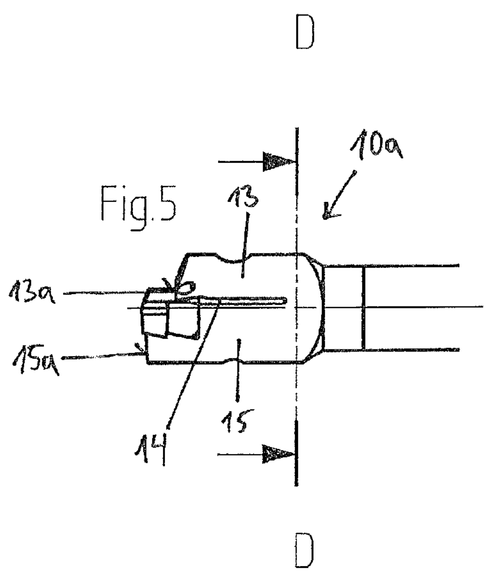

FIG. 4*a* shows a perspective view of a clamping part of the machine tool according to the invention from FIG. 1;

FIG. 4*b* shows a further perspective view of the clamping part of the machine tool according to the invention from FIG. 1;

FIG. 5 shows a side view of the clamping part from FIG. 4*a;*

Figure 5A:
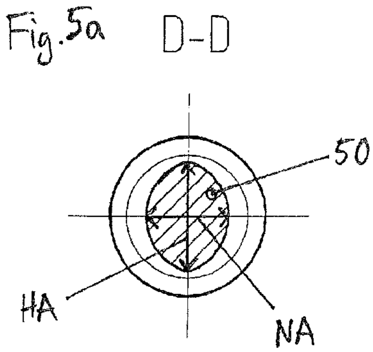
Figure 6:
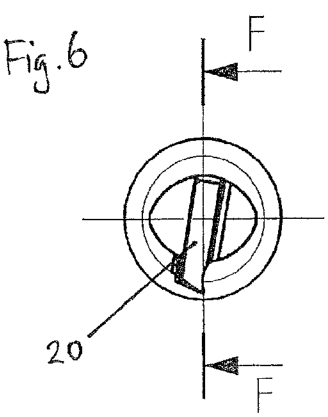

FIG. 5*a* shows a sectional view along the line D-D from FIG. 5;

FIG. 6 shows a front view of the clamping part from FIG. 4*a;*

Figure 6A:
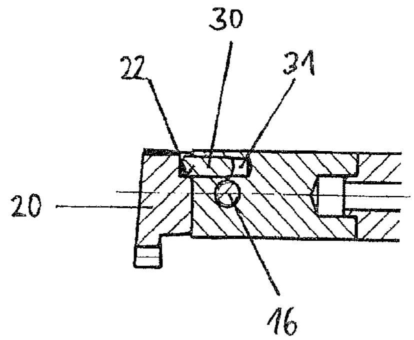
Figure 7:
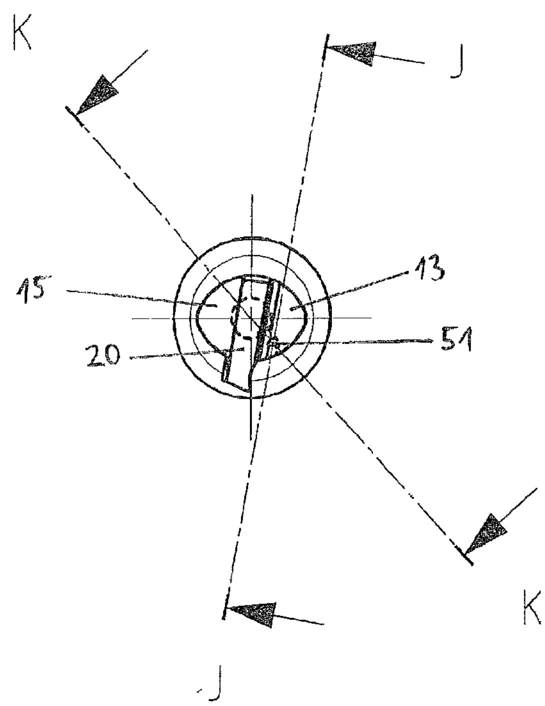
Figure 7:
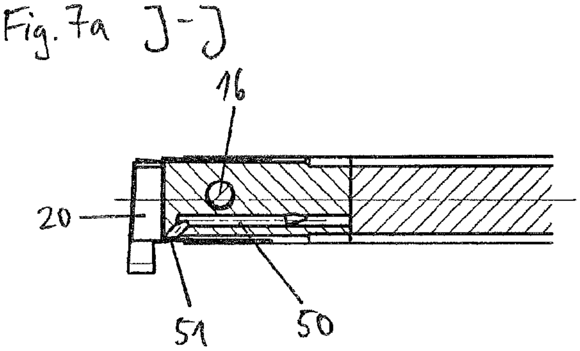

FIG. 6*a* shows a sectional view along the line F-F from FIG. 6;

FIG. 7 shows a further front view of the clamping part from FIG. 4*a;*

Figure 7B:
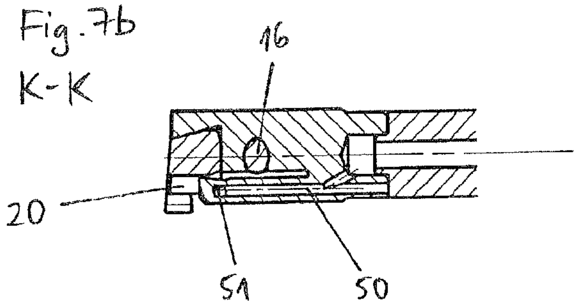
Figure 8A:
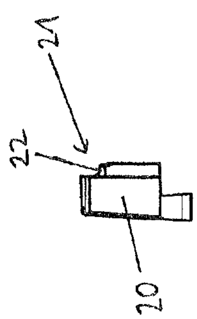
Figure 8B:
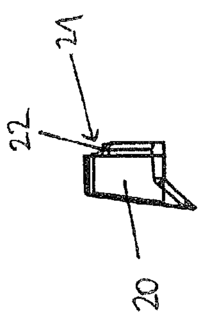
Figure 8C:
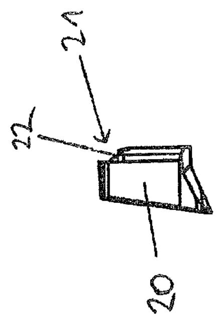
Figure 8D:
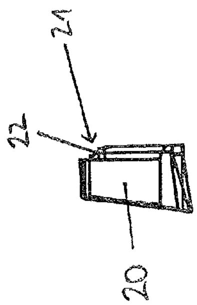
Figure 9A:
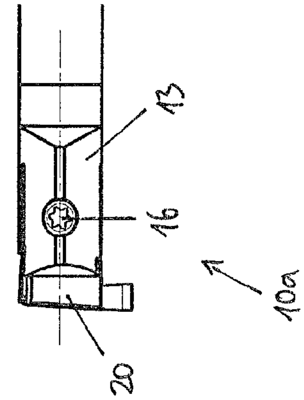
Figure 9B:
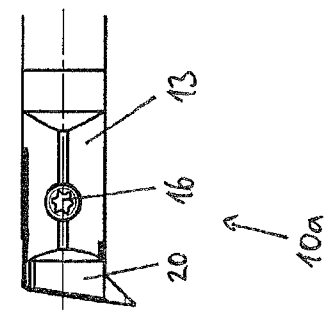
Figure 9C:
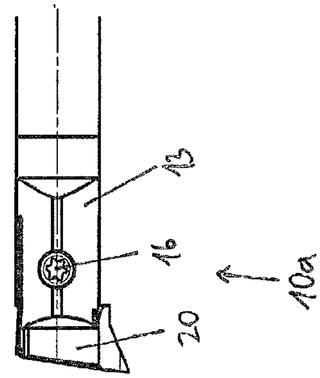
Figure 9D:
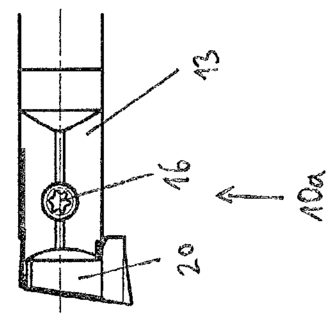

FIG. 7*a* shows a sectional view along the line J-J from FIG. 7;

FIG. 7*b* shows a sectional view along the line K-K from FIG. 7;

FIGS. 8*a* to 8*d* show top views of different cutting bodies;

FIGS. 9*a* to 9*d* show top views of the clamping part from FIG. 4*a* with inserted cutting body according to FIGS. 8*a* to 8*d;*

Figure 11:
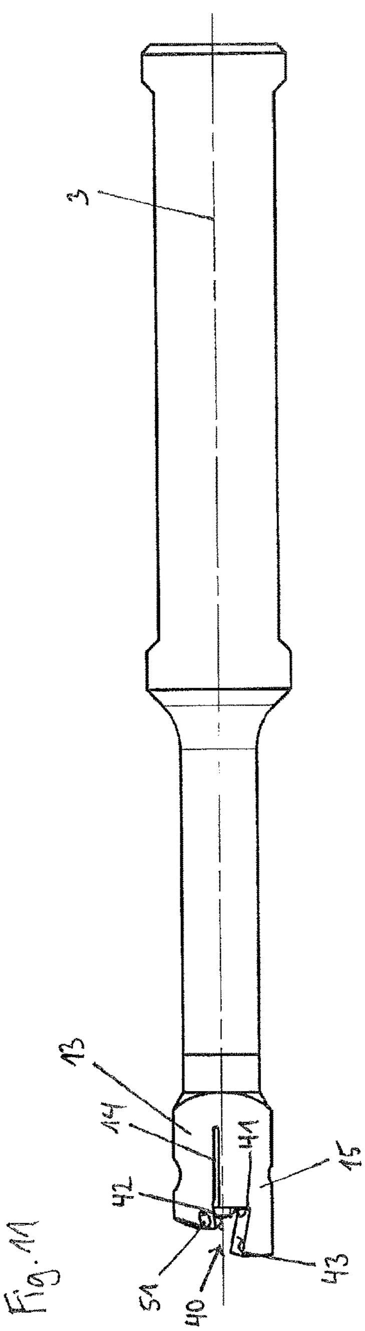
Figure 10:
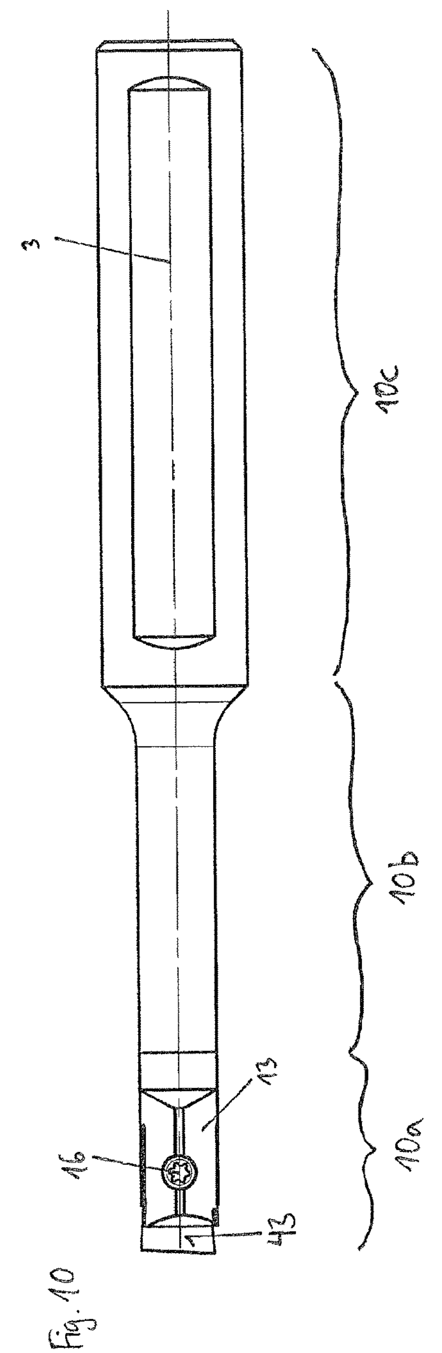

FIG. 10 shows a top view of the machine tool without cutting body;

FIG. 11 shows a side view of the machine tool without cutting body; and

Figure 12:
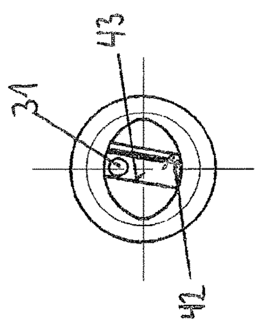

FIG. 12 shows a front view of the machine tool without cutting body

FIGS. 1 to 3 show a machine tool 1 according to the invention in the form of a stationary, non-rotating grooving tool in different views. The grooving tool 1 has an elongate clamping holder 10, which extends along a longitudinal axis 3, a cutting body 20, which is clamped in the clamping holder 10 and which cuts circumferentially, and a stop 30, which is secured in the clamping holder 10 (see FIG. 6*a* in combination with 6). The expressions “left” or “front”, respectively, and “right” or “rear”, respectively, used below thereby refer to the top and side view of FIGS. 1 and 2.

As shown in FIGS. 1 and 2, the elongate clamping holder 10 is functionally divided into a shaft part 10*c* located in the rear, a clamping part 10*a* located in the front, and a connecting portion 10*b*, which connects the shaft part 10*c* and the clamping part 10*a* in the longitudinal direction. The shaft part 10*c* serves to connect the machine tool to a turning machine. As shown in FIGS. 4*a* to 5, the clamping part 10*a* has the clamped cutting body 20, which sits in a recess 40, which passes through the clamping part 10*a* and which is open on the front side of the tool (see FIG. 11). The recess 40, which is open on the front side of the tool, passes centrally through the clamping holder 10 or the clamping part 10*a*, respectively, perpendicularly to the longitudinal axis 3, i.e. beyond the longitudinal axis 3 (see FIG. 3). As shown in the side view in FIG. 11, the recess 40 is defined by means of a flat base surface 41 and two flat flank surfaces 42, 43. The base surface 41 runs perpendicularly to the longitudinal axis 3 of the clamping holder 10. The first flank surface 42 runs parallel to the longitudinal axis 3 and is arranged perpendicularly to the base surface 41. Compared to the base surface 41, the second flank surface 43 has an acute angle. Due to the second flank surface 43, which is arranged at an acute angle to the base surface 41, the recess 40 has a cross section, which tapers in the direction of the front side of the tool, as a result of which the cutting body 20, which is inserted into the recess 40, is secured in a positive manner in the axial direction.

As shown in particular in FIGS. 4*b* and 5, the clamping part 10*a* of the clamping holder 10 is divided into a first flank 13 and a second flank 15 by means of a slot 14. The first flank 13 forms a clamping claw 13, which is formed integrally with the clamping part 10*a* and which clamps the cutting body 20 in the recess 40 and has the first flank surface 42, which laterally limits the recess 40 (see FIGS. 10 to 12). The second flank 15 has the base surface 41 and the second flank surface 43, which is arranged at the acute angle to the base surface 41. The slot 14 is continuous in a direction transversely to the longitudinal axis 3 of the clamping holder 10, and extends in an axially parallel manner from the base or the base surface 41, respectively, of the recess 40 rearwards in the direction of the shaft part 10*c*. As shown in FIG. 11, the slot 14 is arranged outside of the base or of the base surface 41 of the recess 40, respectively. In other words, the slot 14 does not lead into the base surface 41 of the recess 40, but represents an “extension” of the first flank surface 42 in the direction of the shaft part 10*c*. The base or the base surface 41, respectively, of the recess 40 is not separated by the slot 14, as a result of which the cutting body 20 can abut over the entire surface against the base surface 41 and the second flank surface. 43. The base surface 41 and the second flank surface 43, which is arranged at an acute angle to the base surface 41, form a seat, which securely positions the cutting body 20.

As shown in FIGS. 4*a* and 4*b*, the clamping claw 13 can be tensioned against the second flank 14 by means of a clamping screw 16. A clamping of the cutting body 20 in the recess 40 by means of the clamping claw 13 can generally also be attained without the clamping screw 16. The use of the clamping screw 16, however, facilitates the assembly of the cutting body 20 in the recess 40, when clamping claw 13 and slot 14 are dimensioned accordingly. The distance between the two flank surfaces 42, 43 is in particular dimensioned in such a way that the cutting body can be laterally inserted into the recess 40 without canting when the clamping screw 16 is loosened. A subsequent tightening of the clamping screw 16 has the effect that the clamping claw 13 pushes with its first flank surface 42 against the cutting body 20 and fixes the latter in the recess 40.

As shown in FIG. 6*a*, the grooving tool 1 has a stop 30 according to the invention in the form of a stop bolt. The stop bolt 30 is axially secured in a rotationally fixed manner by means of a tight fit in a blind hole 31, which is formed in the base surface 41 (see FIG. 12) and which extends parallel to the longitudinal axis 3, and protrudes into the recess 40. When the cutting body 20 is laterally inserted into the into the recess 40, a bearing surface 22, which is formed in a recess 21 of the cutting body 20 overlapping the stop bolt 30 (see FIGS. 8*a* to 8*d*) bears against the stop bolt 30, so that the cutting body 20 is secured in a positionally accurate manner in the recess 40 in a direction transversely to the longitudinal axis 3.

In spite of the stop bolt 30, which protrudes into the recess 40, the recess 40 can be used over its entire length in its direction of extension to clamp the cutting body 20 by means of the clamping claw 13.

As shown in FIGS. 4*a* and 5, the clamping part 10*a* of the clamping holder 10 is formed in such a way that a front side 13*a* of the first flank 13 forming the clamping claw 13 lies axially behind a front side 15*a* of the second flank 15. In other words, the cutting body 20, which is inserted into the recess 40, protrudes axially beyond the front side 13*a* of the clamping claw 13. On its top side, the cutting body 20, which cuts circumferentially, thus keeps free a chip surface for the chips resulting during the workpiece machining. An obstruction of the chip flow by means of the clamping claw 13 can thus be prevented for the most part.

As shown in FIG. 5*a*, a length portion of the clamping part 10*a* located axially behind the recess 40 has an elliptical cross section, which is defined by a longer major axis HA and a shorter minor axis NA. Compared to the minor axis NA, the cutting body 20 lies so as to be rotated opposite to the cutting force direction of the cutting body 20 (see FIGS. 3, 6, and 7). Compared to a clamping holder or clamping part, respectively, with a round cross section, the diameter of which corresponds to the length of the minor axis NA of the clamping part 10*a*, which has an elliptical cross section, the clamping part 10*a* with elliptical cross section has more material for supporting the cutting body 20 in the region supporting the cutting body 10 in FIG. 11 below the second flank surface 43, due to the elliptical shape. The stability of the clamping part 10*a* is thus increased. Due to the rotation of the cutting body 20 in a direction opposite to the cutting force direction of the cutting body 20 with respect to the minor axis NA, the bearing surface of the cutting body 20 at the second flank 15 is increased, which leads to a further increase of the stability. The torque acting on the cutting body 20 and thus the stress thereto can furthermore be reduced. The cross sections of the connecting portion 10*b* and of the shaft part 10*c* are essentially round in terms of a simple manufacturing.

As shown in the sectional views in FIGS. 7*a* and 7*b*, the grooving tool 1 has a coolant/lubricant supply channel 50, which is guided through the clamping holder 10 to the cutting body 20, comprising a mouth opening 51, which is aligned towards the cutting edge on the cutting body 20. The coolant/lubricant supply channel 50 runs within the clamping claws 13 in the clamping part 10*a*.

FIGS. 8*a* to 8*d* show different circumferentially cutting cutting bodies 20 comprising recess 21 and bearing surface 22 for bearing against the stop bolt 30 in the recess 40 of the clamping part 10*a*. FIGS. 9*a* to 9*d* show top views of the clamping part 10*a* comprising inserted cutting bodies 20 according to FIGS. 8*a* to 8*d*. Cutting bodies 20 with different shapes and geometries can be inserted into the recess 40 of the clamping part 10*a* of the grooving tool 1 according to the invention, and can be positioned in a positionally accurate manner in a direction transversely to the longitudinal axis 3 by means of the stop 30 according to the invention.

It goes without saying that modifications of the above-described exemplary embodiment are possible, without leaving the basic idea of the invention defined by the claims.

The invention claimed is:

1. A machine tool, comprising:

a clamping holder, which extends along a longitudinal axis, the clamping holder comprising a clamping holder recess, a cutting body, a portion of which is in the clamping holder recess, the clamping holder recess passes through the clamping holder in a direction transversely to the longitudinal axis and the clamping holder recess is open on a front side of the tool, and a stop, which is secured in the clamping holder recess and against which the cutting body abuts in the direction transversely to the longitudinal axis, the clamping holder is a one-piece integral structure and comprises a clamping claw, a second flank, and a slot, the cutting body is clamped between the clamping claw and the second flank, the slot separates the clamping claw from the second flank, and a surface of the slot is co-planar with a surface of the clamping claw.

2. The machine tool according to claim 1, wherein the stop comprises a stop bolt, which is fastened to the clamping holder and which protrudes into the clamping holder recess.

3. The machine tool according to claim 1, wherein the cutting body comprises a cutting body recess, and the cutting body recess comprises a bearing surface that abuts against the stop.

4. The machine tool according to claim 1, wherein the clamping holder recess receives the cutting body and structurally holds the cutting body in place.

5. The machine tool according to claim 1, wherein the clamping holder recess has a cross section that tapers in the direction of the front side of the tool.

6. The machine tool according to claim 1, wherein a cross section of the clamping holder recess is defined by a flat base surface, a surface of the second flank, and the surface of the clamping claw.

7. The machine tool according to claim 1, wherein the clamping claw can be tightened against the second flank by means of a clamping screw.

8. The machine tool according to claim 1, wherein a front side of the clamping claw lies axially behind a front side of the second flank.

9. The machine tool according to claim 1, wherein the cutting body protrudes beyond the clamping holder on the front side of the tool.

10. A machine tool comprising:

a clamping holder, which extends along a longitudinal axis, the clamping holder comprising a clamping holder recess, a cutting body, a portion of which is in the clamping holder recess, the clamping holder recess passes through the clamping holder in a direction transversely to the longitudinal axis and the clamping holder recess is open on a front side of the tool, and a stop, which is secured in the clamping holder recess and against which the cutting body abuts in the direction transversely to the longitudinal axis, the clamping holder is a one-piece integral structure and comprises a clamping claw and a second flank, the cutting body is clamped between the clamping claw and the second flank, the clamping holder has an elliptical or symmetrically oval, non-round cross section, which is defined by a longer major axis and a shorter minor axis, at least for a length portion, which lies axially behind the recess, and the cutting body lies parallel or obliquely to the minor axis.

11. The machine tool according to claim 10, wherein compared to the minor axis, the cutting body lies so as to be rotated opposite to a cutting force direction.

12. A machine tool the machine tool further comprises comprising:

a clamping holder, which extends along a longitudinal axis, the clamping holder comprising a clamping holder recess, a cutting body, a portion of which is in the clamping holder recess, the clamping holder recess passes through the clamping holder in a direction transversely to the longitudinal axis and the clamping holder recess is open on a front side of the tool, a stop, which is secured in the clamping holder recess and against which the cutting body abuts in the direction transversely to the longitudinal axis, and a coolant/lubricant supply channel, the clamping holder is a one-piece integral structure and comprises a clamping claw and a second flank, the cutting body is clamped between the clamping claw and the second flank, the coolant/lubricant supply channel is guided through the clamping holder to the cutting body, comprising a mouth opening, which is aligned towards a cutting edge or cutting edges on the cutting body.

13. A machine tool, comprising:

a clamping holder, which extends along a longitudinal axis, a cutting body that can be inserted into a recess, which passes through the clamping holder in a direction transversely to the longitudinal axis and which is open on a front side of the tool, and a stop, which is secured in the recess and against which the cutting body abuts in the direction transversely to the longitudinal axis, the clamping holder having an elliptical or symmetrically oval, non-round cross section, which is defined by a longer major axis and a shorter minor axis, at least for a length portion, which lies axially behind the recess, and the cutting body lying parallel or obliquely to the minor axis.

14. A machine tool, comprising:

a clamping holder, which extends along a longitudinal axis, a cutting body that can be inserted into a recess, which passes through the clamping holder in a direction transversely to the longitudinal axis and which is open on a front side of the tool, a stop, which is secured in the recess and against which the cutting body abuts in the direction transversely to the longitudinal axis, and a coolant/lubricant supply channel, which is guided through the clamping holder to the cutting body, the coolant/lubricant supply channel comprising a mouth opening, which is aligned towards a cutting edge or cutting edges on the cutting body.

15. A machine tool, comprising:

a clamping holder, which extends along a longitudinal axis, the clamping holder comprising a clamping holder recess, and a slot, a cutting body, a portion of which is in the clamping holder recess, the clamping holder recess passes through the clamping holder in a direction transversely to the longitudinal axis, and the clamping holder recess is open on a front side of the tool, a stop, which is secured in the clamping holder recess and against which the cutting body abuts in the direction transversely to the longitudinal axis, the clamping holder recess defined by a base surface of the clamping holder that is perpendicular to the longitudinal axis, a first flank surface of the clamping holder that is perpendicular to the base surface, and a second flank surface of the clamping holder that defines an acute angle relative to the base surface, and a surface of the slot is co-planar with the first flank surface.

16. The machine tool according to claim 15, wherein the clamping holder defines a slot, a first surface of the slot is co-planar with the first flank surface of the clamping holder.

17. The machine tool according to claim 16, wherein the first flank surface of the clamping holder and the base surface of the clamping holder are on opposite sides of the slot.

* * * * *